United States Patent [19]

Takeuchi et al.

[11] Patent Number: 4,796,123
[45] Date of Patent: Jan. 3, 1989

[54] SLOW REPRODUCING APPARATUS FOR VTR OR VCR USING IMAGE MEMORY

[75] Inventors: Hisaharu Takeuchi, Kawasaki; Teruo Itami, Tokyo, both of Japan

[73] Assignee: Kabushiki Kaisha Toshiba, Kawasaki, Japan

[21] Appl. No.: 919,067

[22] Filed: Oct. 15, 1986

[30] Foreign Application Priority Data

Oct. 18, 1985 [JP] Japan ................. 60-231298

[51] Int. Cl.⁴ .................. H04N 5/783; H04N 5/95
[52] U.S. Cl. ................... 360/10.1; 360/10.3; 360/36.2; 360/70; 358/339
[58] Field of Search ............ 360/10.1, 10.3, 10.2, 360/36.2, 36.1, 33.1, 37.1, 70, 75, 77, 32, 74.1; 358/335, 337, 338, 339, 312, 320, 321

[56] References Cited

U.S. PATENT DOCUMENTS

| | | | |
|---|---|---|---|
| 3,742,132 | 6/1973 | Sanguu | 360/70 |
| 4,214,262 | 7/1980 | Mizukami | 360/36.2 |
| 4,251,830 | 2/1981 | Tatami | 360/36.2 |
| 4,389,678 | 6/1983 | Mizukami | 360/36.2 |
| 4,445,145 | 4/1984 | Moriya | 360/10.2 |
| 4,558,375 | 12/1985 | Sontheimer | 358/338 |

FOREIGN PATENT DOCUMENTS 60-119175 8/1985 Japan.
60-127079 8/1985 Japan.

OTHER PUBLICATIONS

SMPTE Journal, 3-78, "A Digital Noise Reducer for Encoded NTSC Signals", by R. H. McMann, et al., vol. 87, No. 3, pp. 129-133.

Primary Examiner—Alan Faber
Attorney, Agent, or Firm—Cushman, Darby & Cushman

[57] ABSTRACT

In a slow reproducing apparatus, a magnetic tape is intermittently driven. In a tape stop state during the intermittent drive operation, a video signal for one field is written in a field memory, and in a tape moving state during the intermittent driving operation, the written signal is read out from the field memory. A means for correcting a read timing error of the video signal caused by a variation in tape stop position during the intermittent driving operation is used, thus obtaining a noiseless, stable, slow reproduced image.

12 Claims, 8 Drawing Sheets

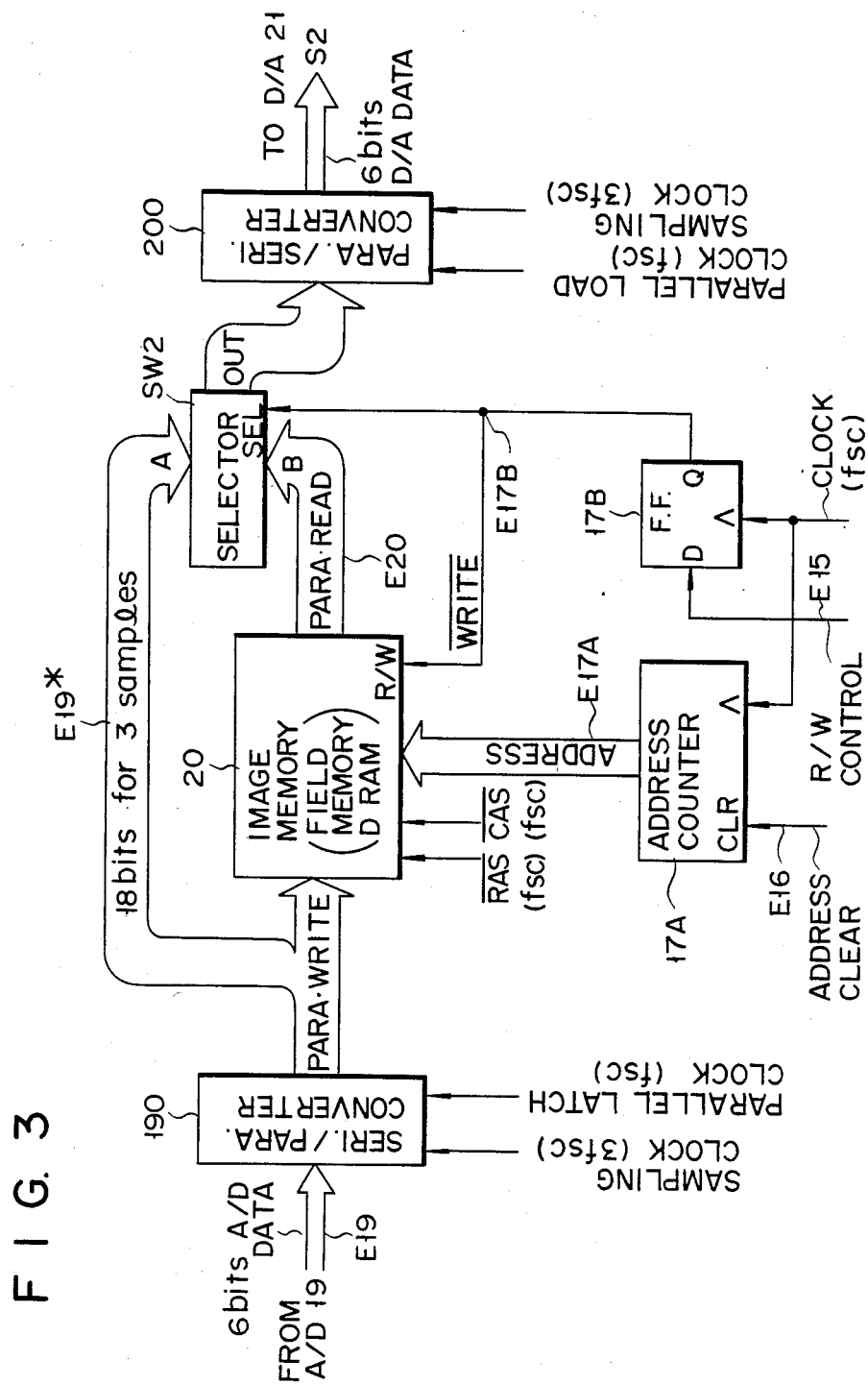
F I G. 3

SLOW REPRODUCING APPARATUS FOR VTR OR VCR USING IMAGE MEMORY

BACKGROUND OF THE INVENTION

The present invention relates to a slow reproducing apparatus for a VTR or VCR using an image memory and, more particularly, to an improvement of a slow reproducing apparatus using a field memory.

Slow reproduction is performed in a video tape recorder (VTR) or a video cassette recorder (VCR) as follows.

(1) Slow reproduction is performed simply by reducing the rotating speed of a capstan motor. In this case, noise is often generated on a reproduced image.

(2) Noiseless slow reproduction is performed by intermittently driving a capstan motor and using a special-purpose reproduction head.

(3) Noiseless slow reproduction is performed by reducing the rotating speed of a capstan motor and using a head which is arranged on a piezoelectric element and is movable in a widthwise direction of a recording track.

In methods (2) and (3), a slow-reproduced image without noise can be obtained. However, in method (2), a special-purpose reproduction head is necessary, and in method (3), a special apparatus for moving the head is necessary. Method (1) is not practical since noise is generated.

SUMMARY OF THE INVENTION

The present invention has been made in consideration of the above situation and has as its object to provide a slow reproducing apparatus for a VTR or VCR which can perform noiseless slow reproduction without requiring a special mechanism, e.g., a special-purpose reproduction head.

In the slow reproducing apparatus of the present invention, a magnetic tape is intermittently driven, a video signal for one field is written in a field memory in a tape stop state during this operation, and the written signal is read out from the field memory in the tape driving state. Readout timing error of the video signal caused by variations in tape stop position during the intermittent driving operation is also corrected to obtain a stable, noiseless slow-reproduced image.

BRIEF DESCRIPTION OF THE DRAWINGS

FIG. 3 is a block diagram showing an internal arrangement and peripheral circuits of a memory address controller (17) shown in FIG. 1;

DETAILED DESCRIPTION OF THE PREFERRED EMBODIMENTS

Figure 4:
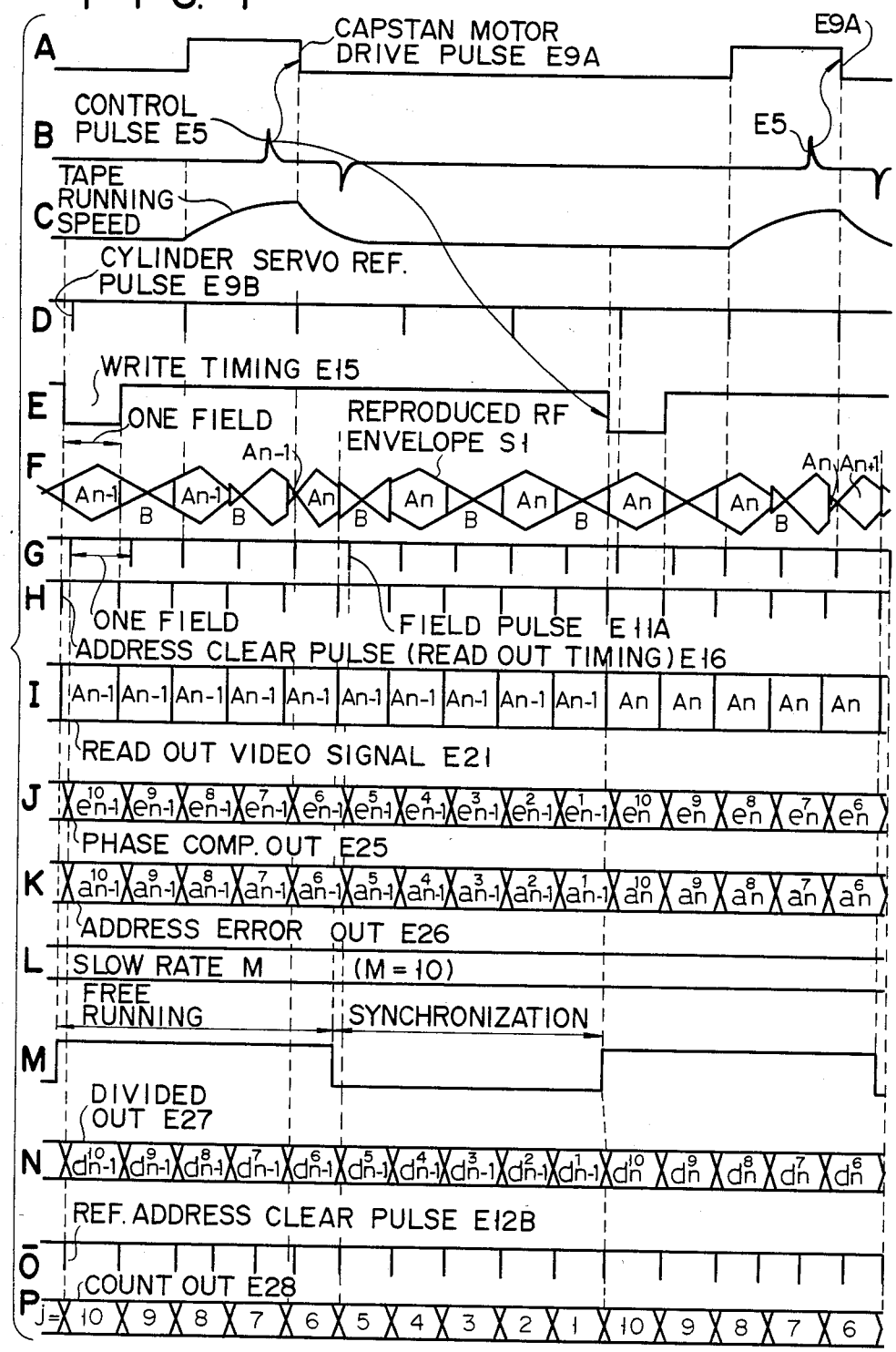
FIGS. 4A to 4P are timing charts explaining the operation of the address clear timing controller (16) shown in FIG. 2.
Figure 5:
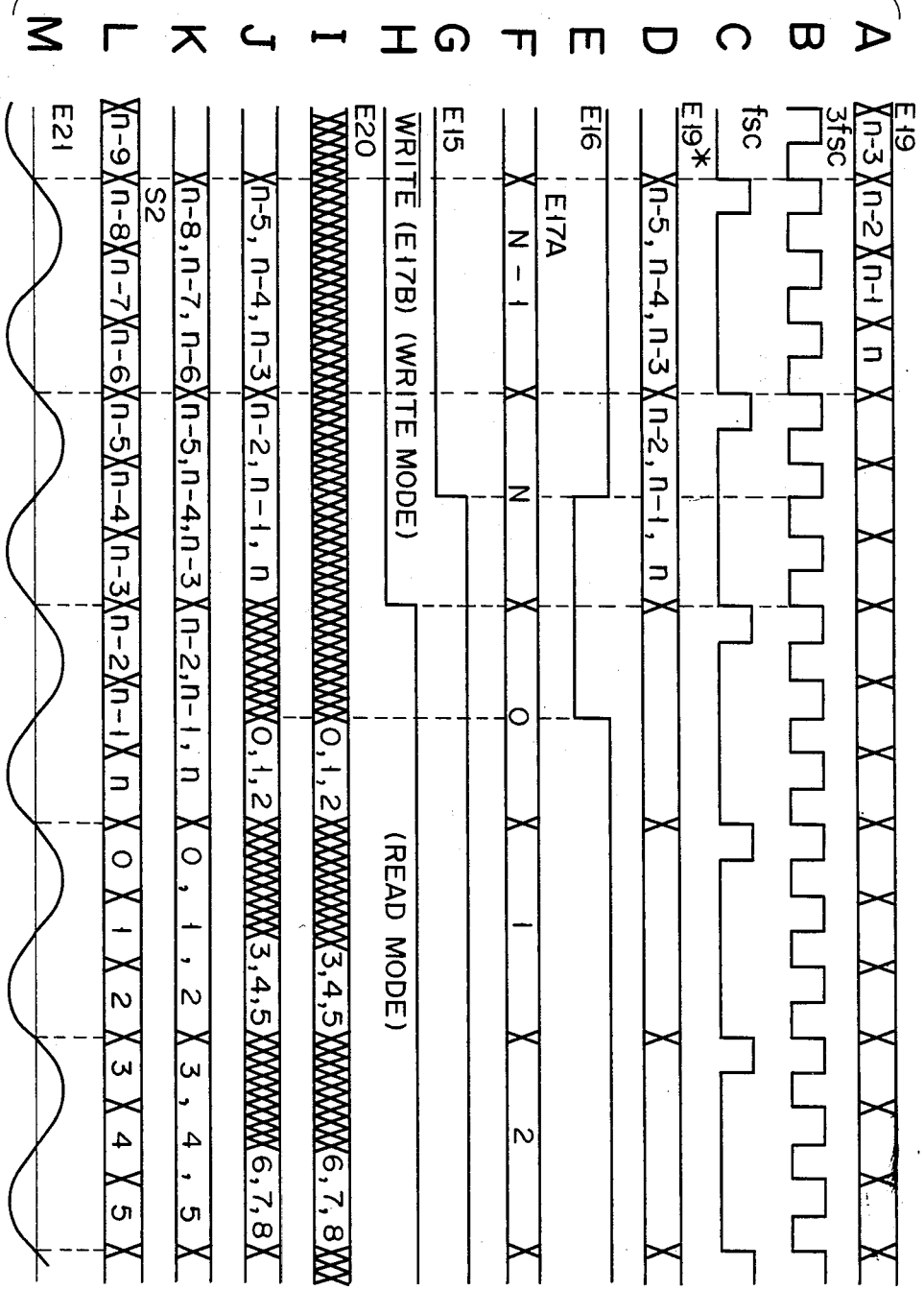
FIGS. 5A to 5M are timing charts explaining the operation of the memory address controller (17) shown in FIG. 3.

A slow reproducing apparatus for a VTR or VCR according to an embodiment of the present invention will now be described with reference to the block diagrams of FIGS. 1 to 3, and the timing charts shown in FIGS. 4 and 5.

Figure 1:
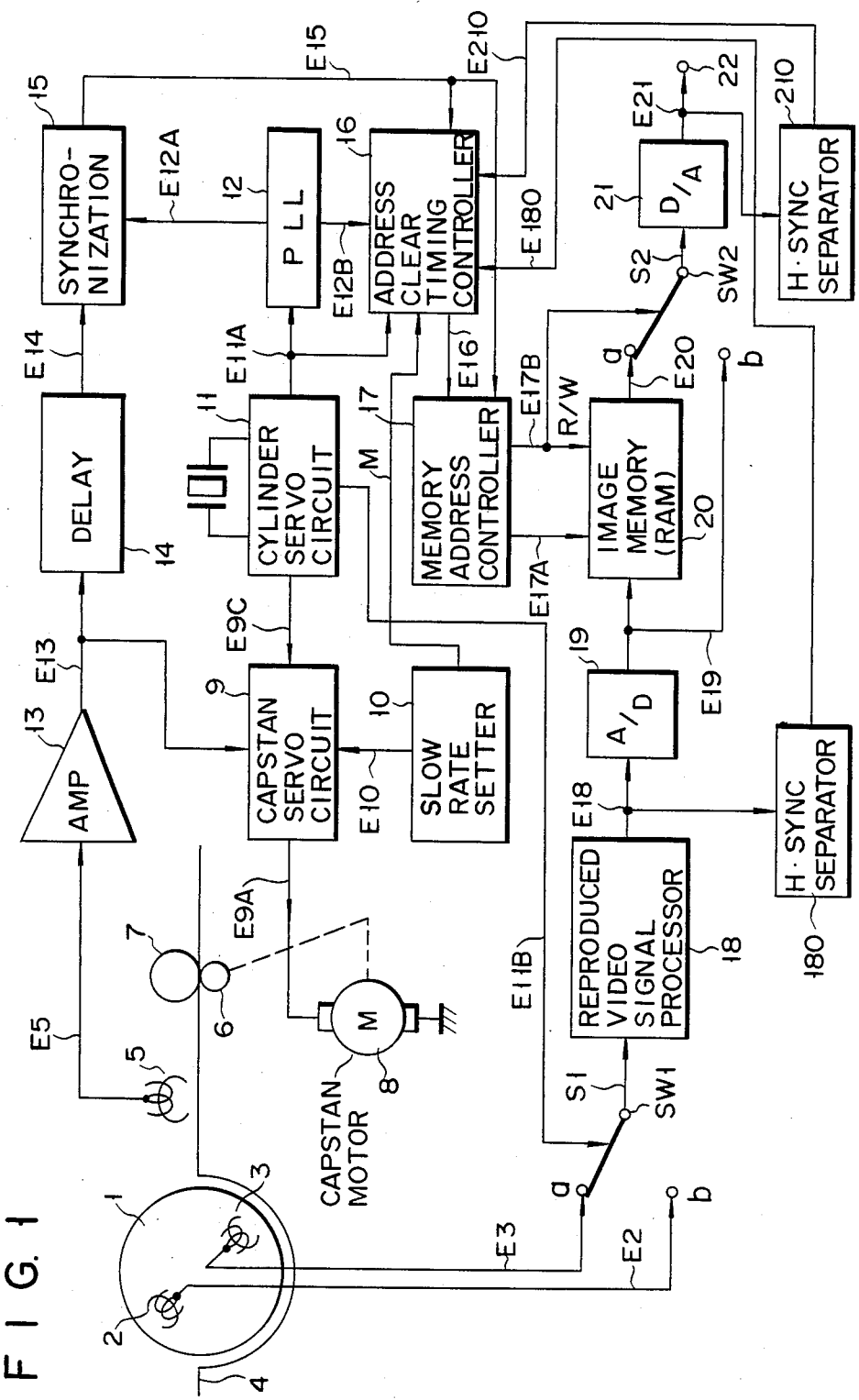
FIG. 1 is a block diagram showing the arrangement of a VCR including a slow reproducing apparatus according to an embodiment of the present invention.

Referring to FIG. 1, video magnetic heads 2 and 3 are mounted on rotary disk 1 to have a relative angle of 180° therebetween. Magnetic tape 4, which is in slidable contact with disk 1, travels by capstan 6 and pinch roller 7. Control head 5 records and reproduces control signal E5 at the side edge of magnetic tape 4. Capstan 6 is rotated by capstan motor 8. Capstan servo circuit 9 controls an intermittent driving operation of capstan motor 8. A tape speed during intermittent slow reproduction is determined by rate setting signal E10 supplied from slow rate setter 10 to servo circuit 9.

Reproduced control signal E5 from control head 5 is amplified by amplifier 13 to be control signal E13 having a given level. Signal E13 is supplied to servo circuit 9 as capstan servo reference data, and is also supplied to delay circuit 14. Delayed output E14 from delay circuit 14 is input to synchronization circuit 15.

Rotation of rotary disk (or rotary cylinder) 1 is controlled by cylinder servo circuit 11 which is operated based on a cylinder servo reference signal (not shown). Servo circuit 11 supplies field pulse E11A, whose frequency is stabilized by means of a reference clock crystal, to phase-locked loop (PLL) circuit 12. Servo circuit 11 also supplies capstan servo circuit 9 with reference signal E9C which is obtained by the crystal oscillator of circuit 11. PLL circuit 12 supplies synchronization signal E12A (e.g., 60 Hz), which is phase-locked with the servo reference signal (e.g., 30 Hz) based on field pulse E11A (e.g., 60 Hz), to synchronization circuit 15. Circuit 15 converts delayed output E14 into stable write timing signal E15, which is free of jitter, in accordance with signal E12A.

Write timing signal E15 is input to address clear timing controller 16. Controller 16 receives reference address clear signal E12B (e.g., 60 Hz), obtained before phase adjustment, from PLL circuit 12; data, indicating slow rate M, from setter 10; field pulse E11A from servo circuit 11; reproduced H.sync pulse E180 from reproduced H.sync separator 180; and readout H.sync pulse E210 from H.sync separator 210 provided for a video signal of a read-out output (E21). Controller 16 generates phase-adjusted address clear signal E16 based on the received data and pulses. (Controller 16 will be described later in detail.)

Address clear signal E16 and write timing signal E15 are input to memory address controller 17. Based on these signals, controller 17 supplies image memory 20 with address data E17A for designating read and write addresses and mode setting signal E17B for setting one of read mode R and write mode W.

Reference numeral SW1 denotes a switcher for alternately selecting outputs E2 and E3 from heads 2 and 3. Output signal S1 from switcher SW1 is input to reproduced video signal processor 18. Analog video signal E18 output from processor 18 is input to H.sync separator 180 and A/D converter 19. Separator 180 separates H.sync pulse E180 from signal E18 and sends it to address clear timing controller 16. A/D converter 19 converts analog video signal E18 into, e.g., 6-bit digital video signal E19. Video data E19 is written in image memory 20 at an address defined by address data E17A when signal E17B sets write mode W. In write mode W, video data E19 is supplied to D/A converter 21 through switch or data selector SW2.

When the write operation of video data E19 to memory 20 is completed, the logic level of mode setting signal E17B is changed to read mode R. In response to this, switch SW2 is switched, and data E20 from memory 20, which is read out in accordance with address data E17A, is input to D/A converter 21 instead of video data E19. D/A converter 21 sends analog video signal E21, corresponding to input video data E19 or E20, to video output terminal 22. Video signal E21 is also input to H.sync separator 210. Separator 210 separates H.sync pulse E210 from signal E21, and sends it to address clear timing controller 16.

The arrangement shown in FIG. 1 has been schematically described. Next, the content of this arrangement will be described in detail.

Because of the limit of a mechanical precision, a temporal stop position of tape 4, which is intermittently fed, often varies relative to a video track position to be reproduced. This variation corresponds to a variation in reproduced video signal E18 along the time base. When a rewriting operation is performed after a continuous readout operation from memory 20 is made, discontinuity in time (to be referred to as time skip hereinafter) occurs between readout data E20 and write data E19. (Data E19 also serves as output signal S2 through switch S2). The time skip means that the phase of H.sync signal at one time is different from that at another time, and causes a change in horizontal skew. An irregular skew instantaneously occurs in video output S2 selected by switch SW2 each time the image content stored in memory 20 is updated, resulting in poor reproduced image.

In this embodiment, the above problem is solved as follows. As shown in FIG. 4M, read timing control of memory 20 is divided into a free running period and a synchronization period. The free running period can include a period from when a signal write operation to memory 20 is completed until tape movement (FIG. 4C) is completed.

During the free running period, since the intermittent driving operation and its influence still remain, the time base of reproduced video signal E18 cannot be stabilized. During this period, therefore, the readout operation from memory 20 is performed independently of the time base of reproduced video signal E18. For this purpose, address signal E16 can be generated in synchronism with signal E12B generated from PLL circuit 12.

The synchronization period is kept as long as possible, so that the time base of readout data E20 is slowly synchronized with that of actual reproduced video signal E18 (or write data E19). For this purpose, the generation timing of address clear signal E16 is gradually advanced (or delayed) for each continuous field, so that data E20 is synchronized with data E19 before the next rewriting operation of the content of memory 20.

More specifically, during the free running period, if H.sync pulse E210 is delayed from H.sync pulse E180, pulse E210 is subjected to phase-advance processing during the synchronization period, so that the phase of pulse E210 matches that of pulse E180. After this phase matching is achieved, the rewriting operation of memory 20 is performed by write timing signal E15.

In this manner, when the generation timing of address clear signal E16 is gradually corrected for each field, generation of skew can be dispersed in these correction fields. Therefore, the generation of skew will not be concentrated in rewriting of memory 20, unlike a case wherein the above correction operation is not performed.

Figure 2:
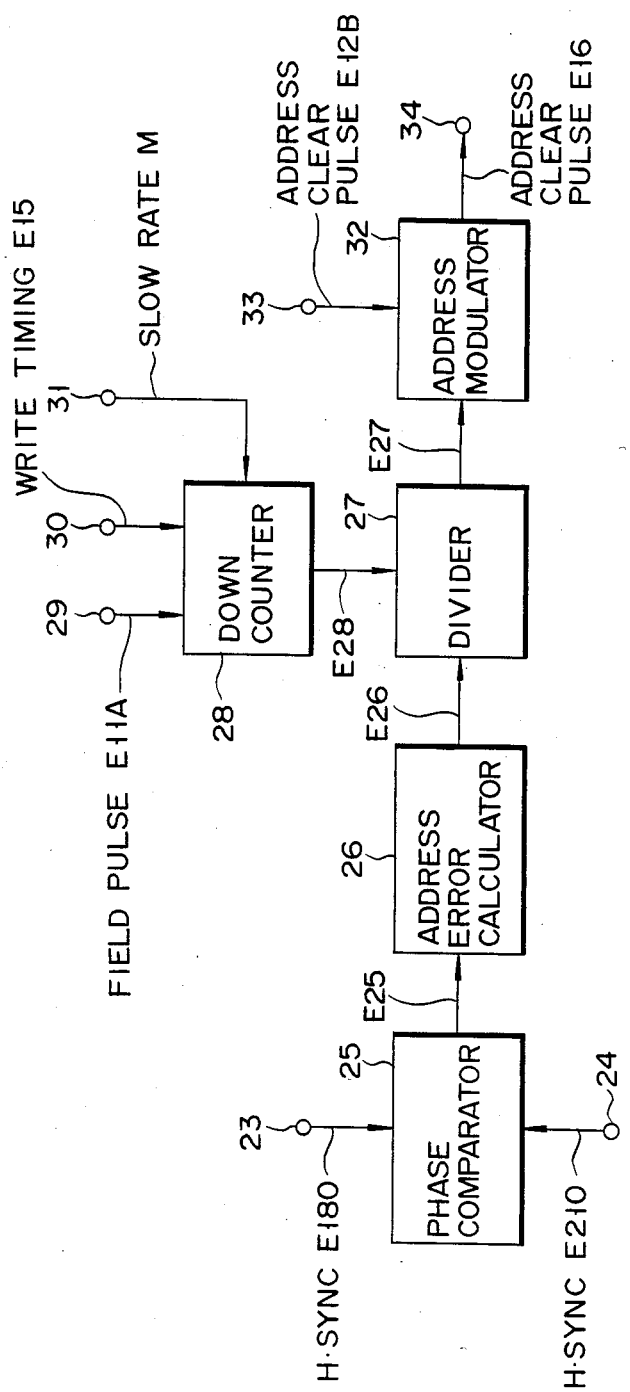
FIG. 2 is a block diagram showing an internal arrangement of an address clear timing controller (16) shown in FIG. 1.

Synchronization (phase matching) of pulses E210 and E180 is executed by address clear timing controller 16 shown in FIG. 2 in detail.

H.sync pulses E180 and E210 from H.sync separators 180 and 210 shown in FIG. 1 are respectively supplied to input terminals 23 and 24 of phase comparator 25 shown in FIG. 2. Comparator 25 supplies signal E25, indicating a phase difference between pulses E180 and E210, to address error calculator 26. Calculator 26 supplies address error data E26, indicating the phase difference (time difference) between pulses E180 and E210, to divider 27. Calculator 26 can be constituted by an A/D converter for generating digital data corresponding to the analog phase difference between H.sync pulse E180 at terminal 23 and H.sync pulse E210 at terminal 24.

Divider 27 divides data E26 with predetermined data E28, and outputs address modulation data E27. Data E28 is obtained as a count output of counter 28. Counter 28 receives field pulse E11A, indicating the start portion of each field, through terminal 29; write timing signal E15 through terminal 30; and the data, indicating slow rate M, through terminal 31. Counter 28 can be a down counter which loads an initial value corresponding to slow rate M based on signal E15 and counts down from the initial value in response to pulse E11A (or it can be an up counter which loads a maximum count value corresponding to slow rate M based on signal E15 and counts up pulse E11A from a count "zero").

Address modulation data E27 from divider 27 is supplied to address modulator 32. Modulator 32 delays reference address clear signal E12B supplied from PLL circuit 12 through terminal 33 in accordance with data E27, and sends address clear signal E16 to terminal 34. Signal E16 is used for clearing an address counter (17A in FIG. 3) in memory address controller 17. Modulator 32 can be constituted by, e.g., a CCD delay line whose delay time is changed in accordance with the content of data E27. Alternatively, modulator 32 can be a digital delay circuit which determines, in accordance with output data E27 from divider 27, the number of clocks from the generation of reference address clear pulse E12B until the generation of address clear pulse E16.

The operation of address clear timing controller 16 can be summarized as follows. Phase comparator 25 compares phases of reproduced H.sync pulse E180 and H.sync pulse E210 read out from memory 20. Comparison output E25 is input to address error calculator 26, thus obtaining address value E26 corresponding to a time error between pulses E180 and E210. Meanwhile, counter 28 counts field pulse E11A (a signal indicating the beginning of a field) in accordance with slow rate set data M and write timing signal E15, and outputs data E28 indicating the number of the field counted from the current field, for which the write access to memory 20 is performed. Output E28 from counter 28 is input to divider 27, and output E26 from calculator 26 is divided by output E28. Resultant output signal E27 indicates an address number to be corrected at the time of the next address clear operation. Address correction value E27 is input to address modulator 32, and address modulator 32 slightly changes the phase of reference address clear signal E12B obtained from PLL circuit 12. The time (or phase) difference between reproduced signal E19 and signal E20 read out from memory 20 is gradually reduced by correction with thus obtained address clear signal E16.

Address controller 17 to be operated based on address clear signal E16 from address clear timing controller 16, image memory 20, and their peripheral circuits can be arranged as shown in FIG. 3. More specifically, address counter 17A is cleared by address clear signal E16 (FIGS. 4H and 5E). Counter 17A counts clock fsc (FIG. 5C) at the same frequency as that of a color subcarrier (3.58 MHz in the NTSC system), and supplies, in accordance with the count value, address data E17A (FIG. 5F) to memory 20. Write timing signal E15 (FIGS. 4E and 5G) is supplied to the D input terminal of D flip-flop 17B. Flip-flop 17B is clocked by clock fsc, and outputs mode setting signal E17B (FIG. 5H). Signal E17B indicates write mode W at logic level "0" obtained before the generation of specific clock fsc which appears immediately after the leading edge of signal E15. Signal E17B also indicates read mode R at logic level "1" obtained after the generation of said specific clock fsc.

Mode setting signal E17B ($\overline{\text{WRITE}}$) is supplied to the read/write switching input terminal of memory 20. Memory 20 is formed of a DRAM which receives a row address strobe pulse ($\overline{\text{RAS}}$) at frequency fsc and a column address strobe pulse ($\overline{\text{CAS}}$) at frequency fsc, in addition to made setting signal E17B and address data E17A. If signal E17B is at logic level "0" (write mode), input data (parallel 18-bit write data) E19* (FIG. 5D) is stoed at the address of memory 20 designated by data E17A, in accordance with pulses $\overline{\text{RAS}}$ and $\overline{\text{CAS}}$ and data E17A. If signal E17B is at logic level "1" (read mode), stored data (parallel 18-bit data) E20 (FIG. 5I) is read out from memory 20.

Data E19* and E20 are input to input ports A and B of data selector SW2, respectively. Selector SW2 selects data E19* at input port A when signal E17B is at logic level "0", and selects data E20 at input port B when signal E17B is at logic level "1". Selected parallel 18-bit data E19* or E20 is loaded to parallel/serial converter 200 at a timing of clock fsc. The loaded parallel 18-bit data (FIG. 5K) is sampled in units of 6 bits by sampling clock 3fsc (FIG. 5B) having a triple frequency of fsc, and is converted to serial data S2 (FIG. 5L) in units of parallel 6 bits. Data S2 is converted to analog video signal E21 (FIG. 5M) through D/A converter 21 shown in FIG. 1.

Data E19* to be input to memory 20 is obtained from serial/parallel converter 190, by serial-parallel converting three sets of 6-bit write data E19 (FIG. 5A) (using 6 bits as one set) delivered from A/D converter 19. This conversion is made by using clocks fsc and 3fsc as in converter 200. In this manner, when converters 190 and 200 are driven using a clock (fsc) common to the clock (fsc) of address counter 17A, even if video data (E19* and E20) are switched by selector SW2, the phases of a color subcarrier included in video output S2 become continuous. Thus, color extinguishment due to the switching operation of selector SW2 can be prevented without using a special processing circuit, e.g., a chroma inverter.

The operation of this embodiment shown in FIGS. 1 to 3 will now be described with reference to the timing charts shown in FIGS. 4 and 5.

When the VCR is set in a slow reproducing mode, capstan motor 8 is intermittently driven by drive pulse E9A (FIG. 4A) from servo circuit 9. Capstan 6 is intermittently rotated by pulse E9A, so that tape 4, sandwiched between capstan 6 and pinch roller 7, is intermittently driven as shown in FIG. 4C.

Slow reproduction rate control is performed by changing a stop time period of tape 4. More specifically, when the pulse interval of pulses E9A supplied to motor 8 is increased, the stop time period is prolonged. The longer the stop time period becomes, the lower the slow reproducing rate becomes. The drive pulse interval control is performed to be based on signal E10 from slow rate setter 10.

During the intermittent driving operation, tape 4 is stopped as follows. Upon movement of tape 4 (movement corresponding to one frame) during intermittent slow reproduction, control signal E5 (FIG. 4B) recorded on the side edge of tape 4 is reproduced by control head 5. The stop timing of tape 4 is determined by signal E14. Signal E14 is obtained by appropriately delaying control signal E13, amplified by amplifier 13, by delay circuit 14. In this case, the stop position of tape 4 (the stop position during the intermittent driving operation) is selected, such that reproduced output S1 with large amplitude (FIG. 4F) can be obtained from head 2 or 3.

The write operation in memory 20 is performed when the intermittent feed operation of tape 4 is substantially completed. This is to prevent noise from a reproduced image, to stabilize the number of horizontal scanning lines during one vertical period, to obtain continuous horizontal synchronizing phases for read/write operation, and so on.

In the present invention, video data E19, corresponding to a signal from head 2 or 3 when tape 4 is stopped, is written in memory 20, and video data E20 written in memory 20 is read out during the movement of tape 4, thus effecting noiseless reproduction. In this embodiment, the stop state of tape 4 during the intermittent driving operation can be detected by output signal E14 from delay circuit 14. Output signal E14 is synchronized by synchronization circuit 15 using output E12A from PLL circuit 12 which is phase-locked with reference pulse E11A (FIG. 4G) from servo circuit 11. In this way, write timing signal E15 (FIG. 4E) having a pulse width corresponding to a signal write interval for one field of a video signal can be obtained.

Note that the phase of reference pulse (field pulse) E11A is normally different from that of head switching pulse E11B supplied to switcher SW1. PLL output E12A preferably has substantially the same phase as that of head switching pulse E11B and is a stable signal without jitter.

The write operation in memory 20, using write timing signal E15, will be described below. Video signals E2 and E3 on tape 4 are reproduced by heads 2 and 3, and are alternately derived by switcher SW1 for each field (S1 in FIG. 4F) to be input to reproduced video signal processor 18. In processor 18, a luminance signal is separated from reproduced signal S1 and is FM demodulated. At the same time, a low-frequency-converted chrominance signal is separated from signal S1 and is reverse-converted to a normal chroma subcarrier frequency (3.58 MHz in the NTSC system). These luminance and chrominance signals are added and are output from processor 18. Output analog signal (composite video signal) E18 is input to A/D converter 19, and is converted to digital video data E19. This A/D conversion, performed after the frequency reverse conversion, uses clock 3fsc having a frequency three times higher than reference frequency fsc of the chrominance signal. When write timing signal E15 is supplied from synchronization circuit 15 to memory address controller 17, write instruction E17B is supplied from controller 17 to memory 20, and output E19 from A/D converter 19 is written in memory 20.

Note that a plurality of digital signals (E19 or E19*) (e.g., signals of three samples) is subjected to read/write access at the same time in accordance with memory operation speed, as shown in FIG. 3. In this case, a method described in "A Digital Noise Reducer for Encoded NTSC Signals", SMPTE Journal, Vol. 87, No. 3, March 1978, pp. 129–133, by R. H. McMann, S. Kreinik, J. K. Moore, A. Kaiser, and J. Rossi can be adopted. The disclosure of this article is incorporated in the present application. Since write timing signal E15 is supplied over one field period as described above, a video signal is written in memory 20 in units of fields. In this case, write address instruction E17A is supplied from memory address controller 17 to memory 20 in units of fields.

When a new write operation is performed to memory 20 (the write operation of the video signal for the next field), an address is cleared by address clear signal E16, and the first write address is then assigned (this is called "address clear"). Address clear is also performed during the read operation from memory 20 (to be described later). More specifically, after a video signal for one field is read out, an address is re-assigned to be the first read address (the same as the first write address), and the read operation of the same video signal is repeated.

Address clear signal E16 (FIG. 4H) is supplied from address clear timing controller 16 to address controller 17 in accordance with signal E12B (FIG. 4O) obtained from PLL circuit 12.

The read operation from memory 20 is performed in response to read timing signal E15 (FIGS. 4E and 5G) supplied to controller 17. In this case, the write and read timings are distinguished from each other by the logic level of signal E17B (FIG. 5H). When signal E17B is at "1" level, the read mode is set, and when it is at "0" level, the write mode is set. Video data E20 read out from memory 20 is input to D/A converter 21 through switch (selector) SW2, and is converted from digital data S2 (=E20) to analog signal E21 (FIG. 4I). Then, signal E21 is fed to output terminal 22 as a video signal.

Switch SW2 is switching-controlled by signal E17B from controller 17. When memory 20 is in the read mode, switch SW2 is connected to the contact a side. When video data E19 is written in memory 20, switch SW2 is connected to the contact b side and, at the same time, data E19 written in memory 20 is input to D/A converter 21 through switch SW2. Therefore, during the write operation to memory 20, video output signal E21 from terminal 22 will not be discontinued.

As described above, data E19, which is written in memory 20 in the tape stop state during which reproduced output E2 or E3 at sufficient level can be obtained from head 2 or 3, is continuously read out from memory 20 upon movement of tape 4 to obtain reproduced output E20 (during the movement of tape 4, the reproduced output from the head is decreased), thereby obtaining a noiseless slow reproduced image.

Address error calculation and address modulation in controller 16 will be explained below.

Taking one field as a unit, output E25 from phase comparator 25 is represented by $e_j^i$ (FIG. 4J), and output E26 from address error calculator 26 is represented by $a_j^i$ (FIG. 4K). Parameter i indicates a field number ($1 \leq i \leq n$) and parameter j indicates a value of output E28 from counter 28. The content of $e_j^i$ corresponds to that of $a_j^i$ (for example, $e_j^i = a_j^i$). If a ratio of a slow reproducing tape rate to a standard tape speed is given by slow rate M, the relation $1 \leq j \leq M$ is obtained. FIGS. 4F to 4P show the case wherein M=10 (FIG. 4L). Parameter j (=E28 in FIG. 4P) indicates how many fields of read operations can be performed in memory 20 during one period of write timing signal E15 (FIG. 4E).

In divider 27, a division $E26/E28 = d_j^i = a_j^i/j$ is carried out, and divided output $d_j^i$ (E27 in FIG. 4N) is obtained. Values of $d_j^i$ are totaled during the synchronization period in FIG. 4M, and $\Sigma d_j^i$ is used as an address modulation value for output E27.

Since reference address pulse E12B (FIG. 4O) during the synchronization period is a stable pulse without jitter, address modulation can be efficiently performed using the total of $d_j^i$. This total is obtained by an accumulator (not shown). (If address modulation is performed by individual $d_j^i$ without obtaining a total, since $d_j^i < \Sigma d_j^i$, an address updating amount by single address modulation is reduced, resulting in inefficiency). However, during the free running period, since the time base of reference address clear pulse E12B involves jitter, values of $d_j^i$ are not totaled, and address modulation is performed using individual $d_j^i$.

In this embodiment, the switching timing between the free running period and the synchronization period can be determined using the output pulse of a one-shot which is triggered by the trailing edge of write timing pulse E15. However, this switching can be performed in accordance with the content of counter 28.

When the slow reproducing speed is very low, synchronization can be ended at a predetermined period of time after the free running period.

Phase comparator 25 can be a digital phase comparator for counting an input timing interval of terminals 23 and 24 using a given clock, and address error calculator 26 can be a digital operation circuit which multiplies a digital value from comparator 25 with a given coefficient, or which adds or subtracts it to or from a given constant. If the above-mentioned given clock is the address clock (fsc), output E25 from comparator 25 can be directly used as address error data E26. In this case, calculator 26 can be omitted.

The comparison object of comparator 25 can be a reproduced vertical synchronization signal and a read-out vertical synchronization signal. In addition, controller 16 can be formed of an analog or digital variable delay line instead of the arrangement shown in FIG. 2, so that the delay time for signal E12B is changed by phase difference E25 to achieve phase matching.

Figure 9:
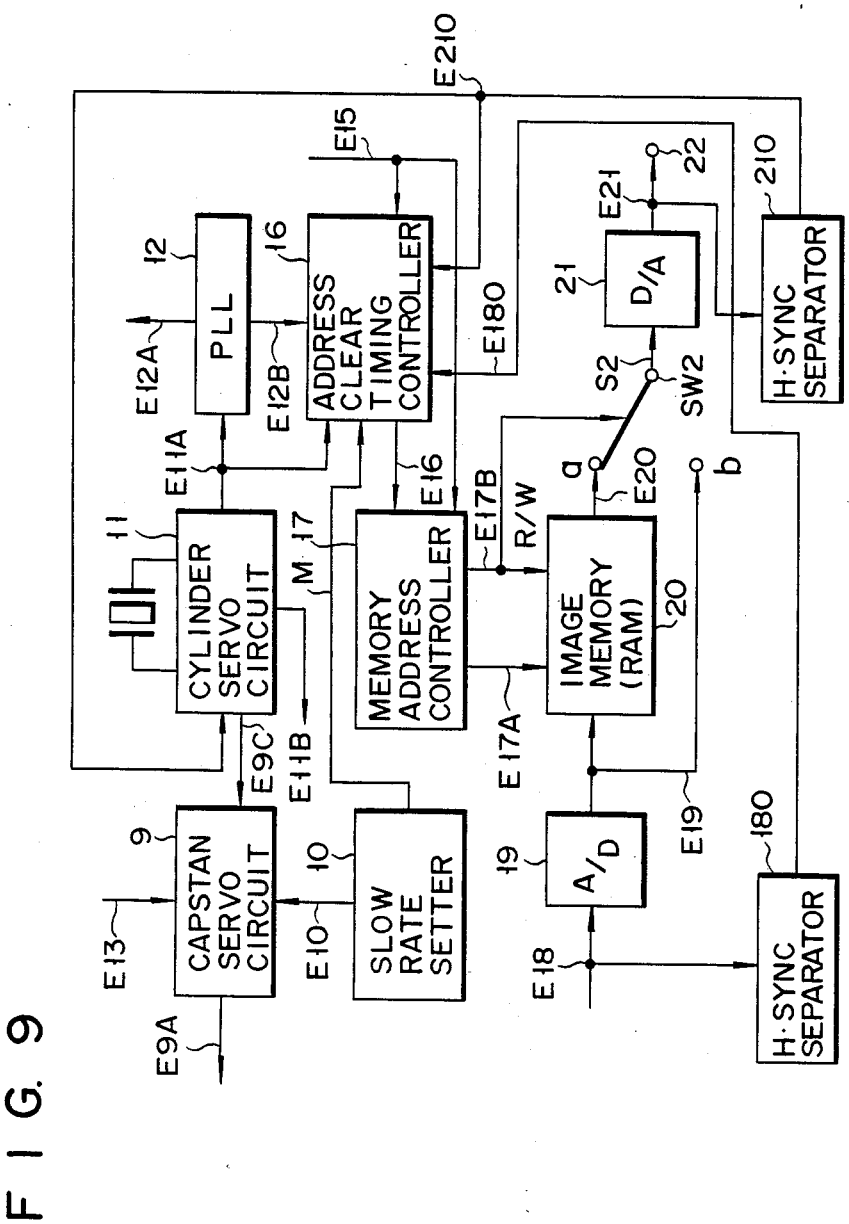
FIG. 9 shows a partial modification of the arrangement of FIG. 1.

Further, as shown in FIG. 9, read H.sync pulse E210 can be supplied to circuit 11 instead of pulse E9B (FIG. 4D), so that the phase of rotation of the cylinder servo be locked with read signal E20 from memory 20.

Figure 6:
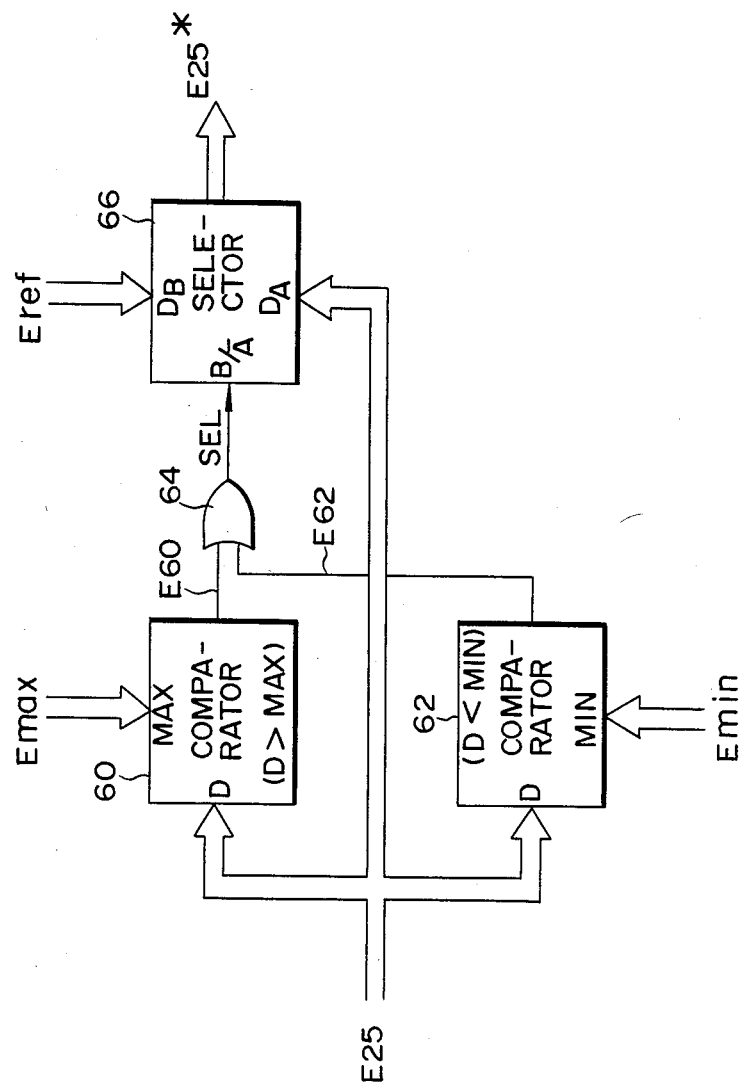
FIG. 6 is a block diagram of a circuit which is applied to the address clear timing controller (16) to improve its function.

When phase difference E25 between reproduced and readout horizontal synchronization signals E180 and E210 is too large, this can be detected as an error, and difference E25 can be replaced with a separately prepared standard value. FIG. 6 shows the arrangement therefor. More specifically, output E25 from comparator 25 is input to comparators 60 and 62 and selector 66. Comparator 60 compares predetermined maximum data Emax with E25. If E25>Emax, comparator 60 sends detection output E60 with logic level "1", which indicates extremely high level, to selector 66 through OR gate 64. Selector 66 then selects standard value Eref representing a specific value of E25 which is obtained when the read and write timings substantially coincide with each other. Thus selected data E25* is input to address error calculator 26, instead of E25.

Meanwhile, comparator 62 compares predetermined minimum data Emin with E25. If E25<Emin, comparator 62 sends detection output E62 with logic level "1", which indicates extremely low level, to selector 66 through OR gate 64. Selector 66 then selects data Eref instead of E25, and outputs data E25* (=Eref).

If Emin<E25<Emax, since both data E60 and E62 are at logic level "0", selector 66 selects data E25 and outputs E25* (=E25). In this case, the generation timing of address clear pulse E16 is corrected by address modulator 32 until the level of data E25 becomes minimum.

If the arrangement shown in FIG. 6 is combined with that shown in FIG. 2, address modulation can be performed only when the difference between the write timing (E180) and the read timing (E210) falls in a certain range (Emin to Emax); otherwise (when the absolute value of the difference is extremely large), address modulation can be disabled. In this manner, inconvenience that synchronization between E180 and E210 will not be completed during the synchronization period due to an extremely large timing difference between E180 and E210, can be removed. Further, if data E180 and E210 has substantially the same phase from the beginning and no synchronization operation is required, the read timing of memory 20 can be protected from being slightly varied due to address modulation.

Figure 7:
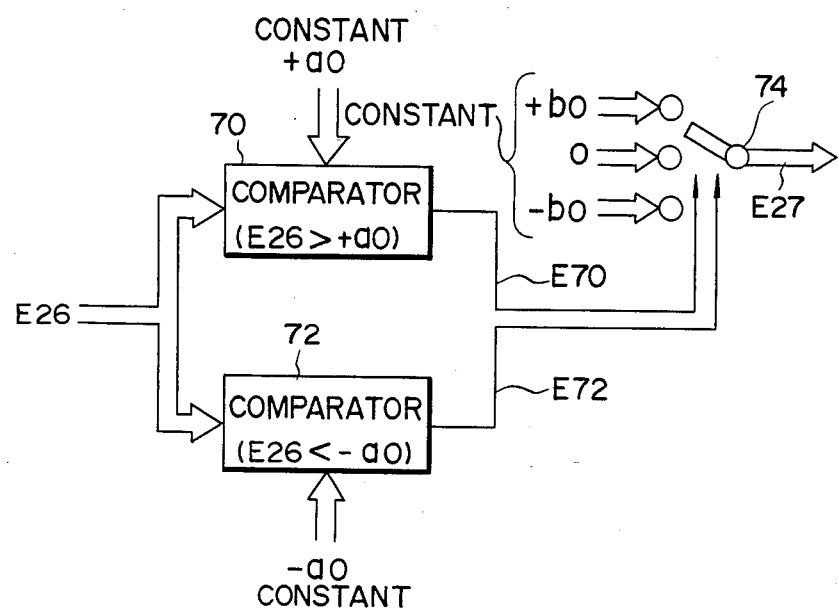
FIG. 7 is a block diagram showing a circuit which can be used instead of circuit elements 27 and 28 shown in FIG. 2.

FIG. 7 shows a case wherein the function of divider 27 and counter 28 shown in FIG. 2 is embodied by another arrangement. More specifically, address error calculation output E26 is input to comparators 70 and 77. Comparator 70 compares predetermined comparison data (or constant) +a0 with E26. If E26>+a0, comparator 70 supplies switching signal E70 of logic level "1" to selector 74. Selector 74 then selects constant +b0, and outputs address modulation data E27 (=+b0). Mean while, comparator 72 compares predetermined comparison data (or constant) −a0 with E26. If E26<−a0, comparator 72 supplies switching signal E72 of logic level "1" to selector 74. Selector 74 then selects constant −b0, and outputs address modulation data E27 (=−b0). If −a0≦E26≦+a0, i.e., if no phase matching operation between pulses E180 and E210 shown in FIG. 2 is necessary, switching signals E70 and E72 are at logic level "0", and selector 74 selects "0" level, resulting in E27=0.

Figure 8:
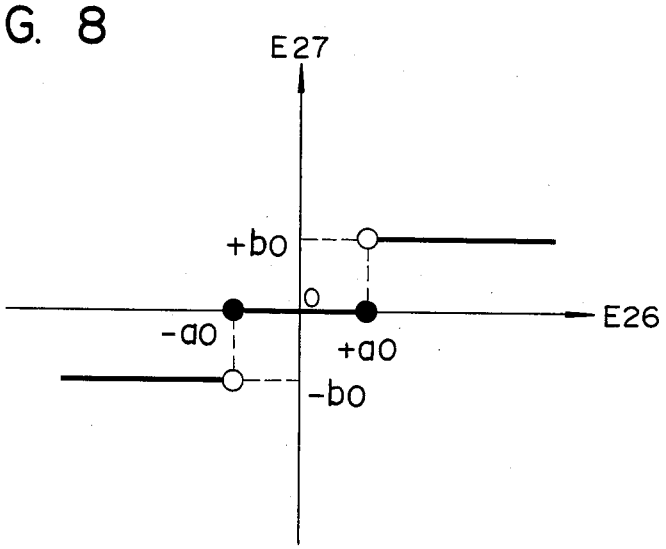
FIG. 8 is a graph exemplifying input/output characteristics of the circuit shown in FIG. 7.

An input (E26) vs. an output (E27) characteristic of the arrangement shown in FIG. 7 is as shown in FIG. 8. The arrangement of FIG. 7 utilizes the method wherein if phase comparison result E25 is larger than a given value, address modulation is performed so that the phase difference between E180 and E210 is reduced by adding or subtracting constant b0 to E25. In other words, predetermined correction is made, using ±b0, for each field until E26 falls within given error range ±a0. The said limination "if E25 is larger than a given value" is provided for preventing vibration of E27 around zero upon repetitive plus or minus correction. Under the condition in which each correction value (±b0) can be made small (e.g., sufficiently slow reproduction), the above limination (±a0) can be omitted. The arrangement shown in FIG. 7 can be modified such that several constants (±a0, ±a1, ±a2, ...) are predetermined in accordance with the level of phase difference E25, and correction constants (±b0, ±b1, ±b2, ...) corresponding thereto can be used.

Incidentally, in the embodiment of FIG. 1, head switching pulse E11B is not directly used for generating write timing signal E15 for the following reason. When tape 4 intermittently runs, rotary disk 1 is slightly swung by irregular tensions applied to tape 4, and the timing of the head switching pulse generated by detecting the rotation of disk 4 fluctuates. This fluctuation also causes the timing of address initialization (address clear) of memory 20 to fluctuate, thus causing a shake in a readout image. In this embodiment, in order to prevent this image shaking, output E12B from PLL circuit 12, which is free of jitter, is used instead of head switching pulse E11B.

Since the speed of the tape relative to the head normally changes during intermittent tape running, the H.sync frequency correspondingly changes. To correct this H.sync frequency variation, the rotating speed of rotary disk 1 is increased (or decreased) so that the reproduced H.sync frequency approaches the normal value (in the NTSC system, 15.75 kHz). However, in this embodiment, this correction is unpreferable since this correction may cause a material difference between the disk rotating phase and the read phase of a field memory.

If a driving force of capstan motor 8 is sufficiently large and a variation in disk rotating speed due to intermittent driving operation does not occur, write timing signal E15 can be generated using head switching pulse E11B instead of reference address clear pulse E12B. In this case, PLL circuit 12 can be omitted. PLL circuit 12 of this embodiment can be either a digital type or an analog type.

A counter circuit can be used instead of PLL circuit 12. In this case, the clock of the counter circuit can be common to a cylinder servo reference signal (or it may have a prescribed correspondence with the cylinder servo reference signal), so that a synchronization signal (E12A) having a necessary phase can be obtained from this counter circuit.

H.sync separator 210 can include a register (not shown) for pulse E210, so that this register stores data indicating the generation timing of pulse E210 instead of pulse E180, and the phase difference between pulse E210 obtained during the next field read operation and the content (E210) of the register is detected to perform address modulation at modulator 32.

According to the present invention as described above, a noiseless slow reproduced image can be obtained. Since the intermittent driving operation is performed, a control signal can be reproduced during this intermittent driving operation even in a super slow reproduction mode. For this reason, there is no problem associated with control signal reproduction unlike a case wherein a tape is continuously driven at an extremely low speed. Since noiseless data is stored in the image memory, even if noise is generated during the tape intermittent running operation, this noise will not pose any problem. Therefore, a control operation during tape running need not be strictly performed. In addition, the influence of skew due to a variation in tape stop positions can be removed, thus obtaining a stable image.

What is claimed is:

1. A slow reproducing apparatus for VTR/VCR using an image memory comprising:
   signal generating means for generating a write timing signal in accordance with a reproduced control signal from a video tape;
   image memory means for storing video signal data of a reproduced video signal from said video tape in accordance with said write timing signal and a given address clear signal which designates write and read start addresses of said image memory means; and
   address clear means for detecting a timing difference between a write timing and a read timing in said image memory means when slow reproduction is performed and correcting address clear signal generation timing so that the amount of said timing difference is substantially minimized.

2. An apparatus according to claim 1, further comprising:
   intermittent running control means for moving said video tape a predetermined number of fields during a free running period which is defined as a former half period of the write timing signal, and stopping said video tape during a synchronization period which is defined as a latter half period of the write timing signal.

3. An apparatus according to claim 1, wherein said address clear means includes:
   H.sync separating means for separating a read-out H.sync pulse from a read-out video signal which is obtained from said image memory means during a period of said read timing;
   and wherein said signal generating means includes:
   cylinder servo means, coupled to said H.sync separating means, for servo-controlling the rotation of a head cylinder based on said read-out H.sync pulse, said head cylinder being provided with rotary heads for providing said reproduced video signal.

4. An apparatus according to claim 3, wherein said H.sync pulse is supplied to cylinder servo means so that a phase of the servo-controlled head cylinder rotaion is locked with a read signal from said image memory means.

5. A slow reproducing apparatus for VTR/VCR using an image memory comprising:
   signal generating means for generating a write timing signal in accordance with a reproduced control signal from a video tape;
   image memory means for storing video signal data of a reproduced video signal from said video tape in accordance with said write timing signal and a given address clear signal which designates write and read start addresses of said image memory means; and
   address clear means for detecting a timing difference between a write timing and a read timing in said image memory means when slow reproduction is performed and correcting address clear signal generation timing so that the amount of said timing difference is substantailly minimized, said address clear means including:
   phase difference detecting means for providing phase difference data indicating a difference between a write phase and a read phase of said video signal data in said image memory means,
   counter means for providing count data indicating how many fields of video signal data are read out from said image memory means since said write timing signal has been generated, said count data being updated in accordance with a slow rate indicating a ratio of a tape running speed during slow reproducing to a standard tape running speed, and
   timing updating means for updating a reference address clear pulse generation timing of a reference address clear pulse based on a ratio of the phase difference data to the pulse based on a ratio of the phase difference data to the count data, and providing given address clear pulse.

6. An apparatus according to claim 5, wherein said phase difference detecting means includes:
   data selecting means for selecting, when the difference between the write and read phases falls in a predetermined range, the phase difference, and for selecting, when the phase difference falls outside the predetermined range, predetermined standard phase data, so that selection data is provided, the reference phase data corresponding to the phase difference data obtained when the difference between the write and read phases becomes substantially minimum; and
   means for outputting the selection data as the phase difference data.

7. A slow reproducing apparatus for VTR/VCR using an image memory comprising:
   signal generating means for generating a write timing signal in accordance with a reproduced control signal from a video tape;
   image memory means for storing video signal data of a reproduced video signal from said video tape in accordance with said write timing signal and a given address clear signal which designates write and read start addresses of said image memory means; and
   address clear means for detecting a timing difference between a write timing and a read timing in said image memory means when slow reproduction is performed and corrceting address clear signal generation timing so that the amount of said timing difference is substantially minimized, said address clear means including:
   phase difference detecting means for providing phase difference data indicating a difference between a write phase and a read phase of said video signal data in said image memory means,
   comparing means for comparing the phase difference data with given comparison data, and providing correction data having a content for reducing the difference of the write/read timing only when the content of the phase difference data falls within a range determined by the comparison data, and
   timing updating means for updating a reference address clear pulse generation timing of reference address clear pulse in accordance with the correction data, and providing the given address clear pulse.

8. A slow reproducing apparatus for VTR/VCR using an image memory comprising:
   signal generating means for generating a write timing signal in accordance with a reproduced control signal from a video tape;
   image memory means for storing video signal data of a reproduced video signal from said video tape in accordance with said write timing signal and a given address clear signal which designates write and read start addresses of said image memory means, said image memory means including:
      first converting means for converting the video signal data into write data in accordance with a given clock signal,
      address counter menas, which is cleared by the address clear signal, for counting the given clock signal to generate address data,
      a read/write memory for storing the write data at an address specified by the address data in a write mode, and outputting read data corresponding o the write data from an address specified by the address data in a read mode,
      second converting means for converting the write data into reproduced video data in accordance with the given clock signal in the write mode, and converting the read data into the reproduced video data in the read mode, and
      third converting means for converting the reproduced video data into an analog composite video signal, and
   address clear means for detecting a timing difference between a write timing and a read timing in said image memory means when slow reproduction is performed and correcting address clear signal generation timing so that the amount of said timing difference is substantially minimized.

9. A slow reproducing apparatus for VTR/VCR using an image memory comprising:
   signal generating means for generating a write timing signal in accordance with a reproduced control signal from a video tape;
   image memory means for storing video signal data of a reproduced video signal from said video tape in accordance with said write timing signal and an address clear signal which designates write and read start addresses of said image memory means;
   address clear means for detecting a timing difference between a write timing and a read timing in said image memory means when slow reproduction is performed and correcting generation timing so that the amount of said timing difference is substantially minimized, said address clear means including:
      phase adjusting means for adjusting, during the free running period, the phase of a reference address clear pulse, which is independent of a variation in time base of the reproduced video signal, so that the difference between the write and read timings is reduced, and generating the given address clear signal.

10. An apparatus according to claim 9, wherein said signal generating means includes:
   delay means for delaying the reproduced control signal by a predetermined time to generate a delayed signal; and
   synchronization means for converting the delayed signal to the write timing signal in accordance with a synchronization pulse which corresponds to a change in field of the reproduced video signal in the synchronization period.

11. A slow reproducing apparatus for VTR/VCR using an image memory comprising:
   signal generating means for generating a write timing signal in accordance with a reproduced control signal from a video tape, said signal generating means including:
      delay means for delaying the reproduced control signal by a predetermined time to generate a delayed signal, and
      synchronization means for converting the delayed signal to the write timing signal in accordance with a synchronization pulse which corresponds to a change in the field of the reproduced video signal in the synchronization period;
   image memory means for storing video signal data of a reproduced video signal from said video tape in accordance with said write timing signal and a given address clear signal which designates write and read start addresses of said image memory means;
   address clear menas for detecting a timing difference between a write timing and a read timing in said image memory means when slow reproduction is performed and correcting address clear signal generation timing so that the amount of said timing difference is substantially minimized; and
   intermittent running control means for moving said video tape a predetermined number of fields during a free running period which is defined as a former half period of the write timing signal, and stoppong said video tape during a synchronization period which is defined as a latter half period of the writ timing signal.

12. A slow reproducing apparatus for VTR/VCR, comprising:
   an A/D converter for converting a video signal reproduced from a magnetic tape to a digital signal;
   means for writing the output from said A/D converter into a field memory;
   means for reading out a digital signal from said memory;
   a D/A converter for converting the digital signal read out from said memory to an analog signal;
   means for correcting a timing error between the read signal and the write signal for said memory; and
   intermittent driving means for intermittently driving said magnetic tape, wherein said magnetic tape is intermittently driven during slow reproduction, the output from said A/D converter is written in said memory in a stop state of said tape during the intermittent driving period, and the write signal is read out from said memory in the tape moving state during the intermittent driving period so that a reproduced signal is provided.

* * * * *